Figure 1:
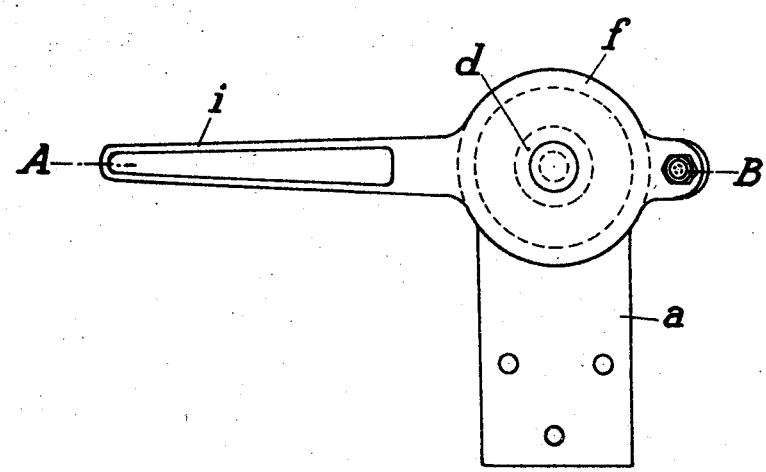

Oct. 30, 1928.

G. HORN 1,689,389

THREAD GUIDE LEVER FOR BRAIDING MACHINES

Original Filed Jan. 21, 1927   2 Sheets-Sheet 1

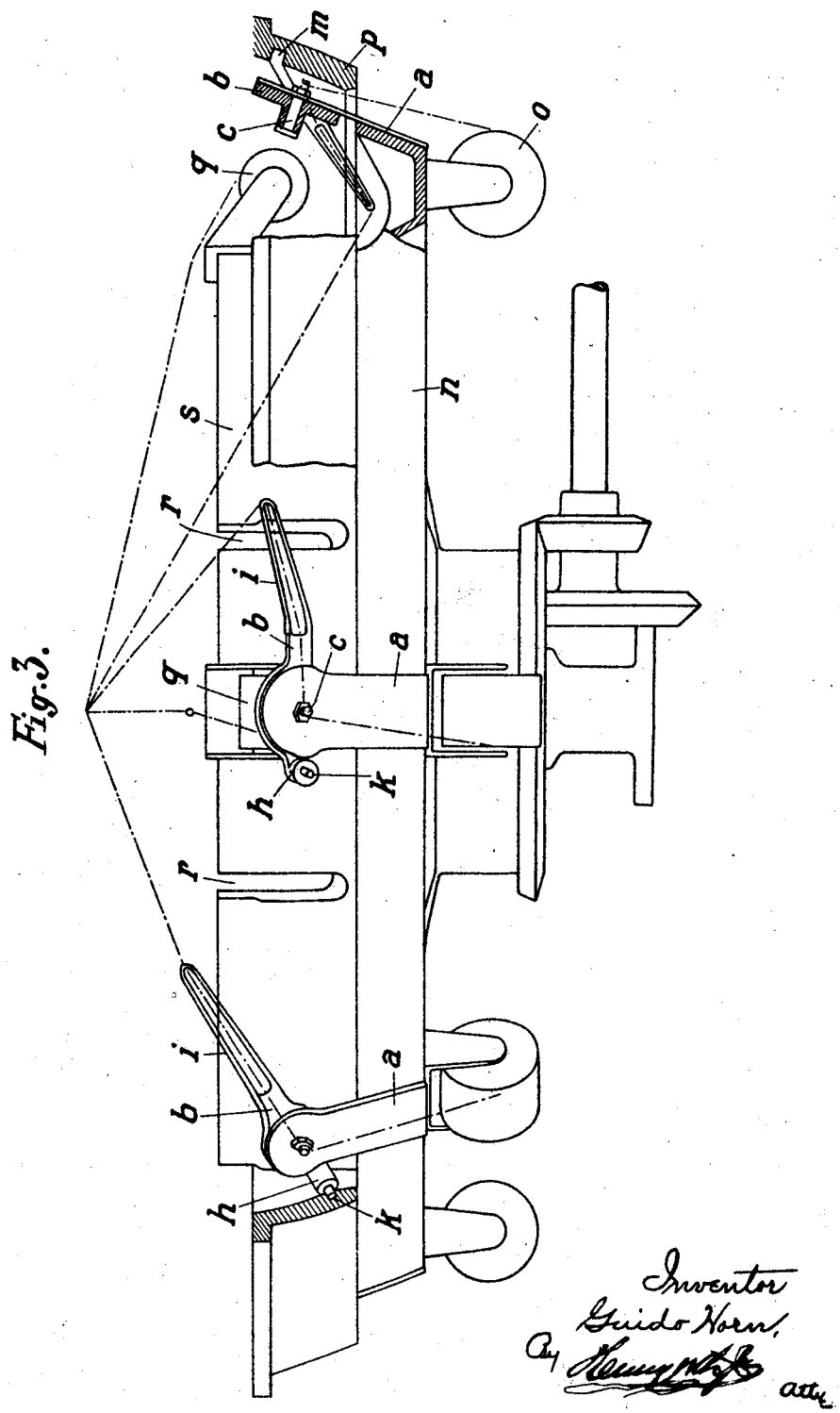

Patented Oct. 30, 1928.

1,689,389

UNITED STATES PATENT OFFICE.

GUIDO HORN, OF WEISSENSEE, NEAR BERLIN, GERMANY.

THREAD-GUIDE LEVER FOR BRAIDING MACHINES.

Application filed January 21, 1927, Serial No. 162,633, and in Germany December 19, 1925. Renewed January 26, 1928.

The invention relates to a thread guide lever for braiding machines, a part of said lever running in a curved guide. The invention consists essentially in a thread guide lever being guided on its carrier by means of an arched part located at a substantial distance from its axis. The bearing part of the lever, at a distance from the axis, is preferably extended in such manner as to form a full ring, the stand being built accordingly.

The invention further consists in the lever arm guiding the thread being balanced by a counter weight on the other arm, whereby the counterweight can simultaneously serve as a bearer for the part which engages in the guide groove.

In the drawing an application of the invention is shown, whereby

Figure 2:
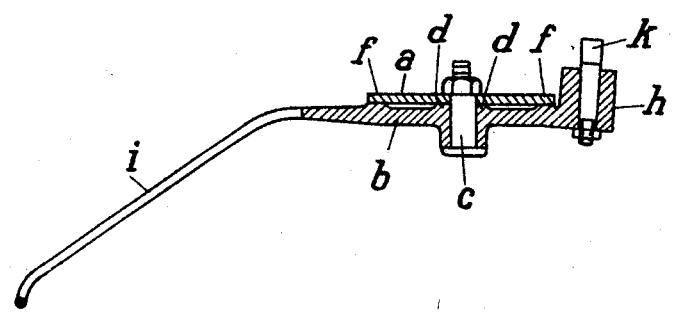

Fig. 1 is a thread guide according to the invention,

Fig. 2 a section on line A—B of Fig. 1 and

Fig. 3 a plan of a braiding machine according to the invention, partially in section.

In the drawing $a$ represents a stand or support, $b$ a thread guide lever pivoted on the stand by means of a screw bolt $c$. Immediately surrounding the bolt $c$ a circular rib forming a bearing surface $d$ and at a further distance from the screw bolt $c$ another forming a bearing surface $f$ is provided on the above mentioned thread guide lever. The stand $a$ at the upper end is shaped accordingly. The bearing surface $f$ is located at a distance from the axis of screw bolt $c$, thus ensuring the lever a wide reach for strain in the direction of the sectional plane according to Fig. 2. Further by giving the bearing surface $f$ a circular shape tensile strain in any other direction is also neutralized to advantage. The surfaces $d$ and $f$ as well as the corresponding bearing surfaces of the stand $a$ can, by careful grinding, be made into bearing surfaces of very high accuracy. $h$ is a counter-weight on that arm of the thread guide lever which is opposite the thread guide $i$. $k$ is a pin engaging in the guide groove $m$ of the machine, and which is arranged by means of a bolt or the like within the counter-weight $h$. The stands $a$ are arranged on an annular revolving carrier $n$ for the lower spools $o$, whereas the guide groove $m$ is arranged in a stationary ring $p$. $q$ are the so-called inner spools which are arranged on a ring $s$ provided with slots $r$ and moving in an opposite direction to ring $n$ or remaining stationary.

Having now more fully described the nature of my invention and in what manner the same is to be performed, I claim:—

1. In a braiding machine, the combination with a spool carrier; of a support fixed thereon having an enlarged bearing surface at its upper end, a thread-guide lever having an enlarged circular portion centrally pivoted on said end and having annular bearing faces concentric to the pivot engaging said bearing surface, said lever having a guide-slot in one end and a counterweight on its opposite end, and a guide-pin mounted in the counterweight.

2. In a braiding machine, the combination with a spool carrier and a fixed member having a guide-groove therein; of a support fixed on the carrier having an enlarged bearing surface at its upper end, a pivot pin mounted in the latter, a two-armed thread-guide lever having an intermediate circular portion axially mounted on said pin and having bearing ribs formed thereon concentric to the latter engaging said bearing surface, said lever having a guide-slot in one end and a counter-weight on its opposite end, and a guide-pin mounted in the counterweight engaging the guide groove of said fixed member.

3. A rapidly oscillated, pivoted braiding machine thread guide, comprising an arm and a standard to which said arm is pivoted, and a ring bearing surface for the arm concentric with its centre of vibration and at a considerable distance from the centre of oscillation.

4. In a braiding machine, the combination of a spool carrier having a bearing surface, a thread guide lever pivoted on the carrier and having a bearing surface engaging the bearing surface of the carrier, one of the bearing surfaces being arcuate and at a considerable distance from the pivot.

In testimony whereof I affix my signature.

GUIDO HORN.